Sept. 8, 1970 — C. H. McCREARY — 3,527,327
OVERRUNNING CLUTCH

Filed Dec. 4, 1968 — 2 Sheets-Sheet 1

INVENTOR.
Charles H. McCreary
BY
F. J. Fadale
ATTORNEY

Sept. 8, 1970  C. H. McCREARY  3,527,327
OVERRUNNING CLUTCH

Filed Dec. 4, 1968  2 Sheets-Sheet 2

INVENTOR.
Charles H. McCreary
BY
F. J. Fodale
ATTORNEY

United States Patent Office 3,527,327
Patented Sept. 8, 1970

3,527,327
OVERRUNNING CLUTCH
Charles H. McCreary, Oak Park, Ill., assignor to General Motors Corporation, Detroit, Mich., a corporation of Delaware
Filed Dec. 4, 1968, Ser. No. 781,004
Int. Cl. B25b *13/46;* F16d *11/00*
U.S. Cl. 192—46                                    10 Claims

ABSTRACT OF THE DISCLOSURE

An overrunning clutch in which trapezoidal levers are pivotally mounted on a cage which in turn is journaled on the driving member of the clutch. The driving member has recesses which receive the levers for pivotal movement therein between a freewheel position and a lock-up position with a driven member of regular polygonal shape.

In a second embodiment, the trapezoidal levers are used in a one-way ratchet-type wrench with the ratcheting occurring between the levers and a hexagonal nut being tightened or removed.

My invention relates generally to a device for transmitting torque in a single direction, such as, an overrunning clutch or a ratchet wrench.

More specifically with regard to an overrunning clutch, my invention is directed to a positive lock-type clutch. Present day clutches of this type usually utilize either ratchet and pawl principle or a wedging-type principle such as is used in a roller or sprag clutch. Stated in its broadest terms, the object of this aspect of my invention is to provide a clutch having parts of simpler and less expensive construction that that of either of the two general types of clutches now available. This feature includes use of a comparable member which does not require the relatively expensive fabrication of a ratchet wheel nor does it require the small tolerances and surface finishes associated with a wedging element and its associated parts.

It is also an object of the first embodiment of my invention to provide an overrunning clutch which unlike the wedging-type clutch is independent of the coefficient of friction and yet which provides a larger contact surface for lock-up than that for a comparable size clutch of the ratchet and pawl type.

Another feature of this embodiment of my invention is that it has a larger torque capacity than other comparably-sized clutches of the same material.

Specifically with regard to the second embodiment of my invention, it is directed to a ratchet wrench of the type wherein the ratcheting occurs between the wrench head and the part being tightened or loosened rather than within the wrench itself.

A feature of this second embodiment of my invention is that it is especially suitable for high speed power operation in that the high speed power source aids in reorientating the nut or bolt-engaging elements of the wrench from their ratcheting to their engaged position.

The exact nature of this invention as well as other objects and advantages thereof will be readily apparent from consideration of the following specification relating to the annexed drawing in which:

In FIG. 1, the clutch parts are positioned for freewheeling operation of the clutch.

Figure 6:
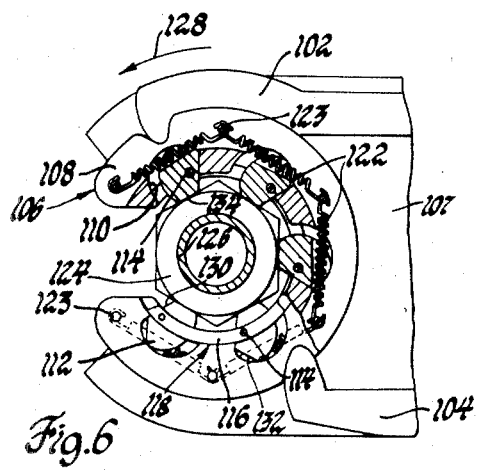
FIG. 6 is an enlarged view of the wrench head shown in FIG. 5 with the various parts thereof positioned at the end of the power stroke.

FIGS. 7, 8, 9, and 10 shows various positions of parts shown in FIG. 6 as the wrench head ratchets over the corners of a nut or bolt.

Figure 8:
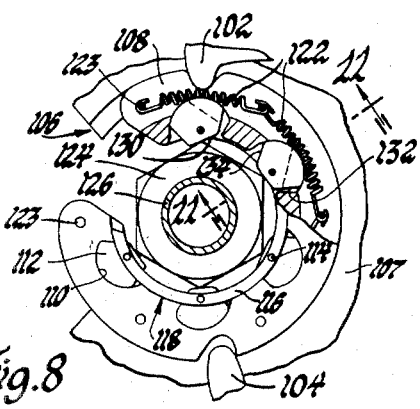
Figure 11:
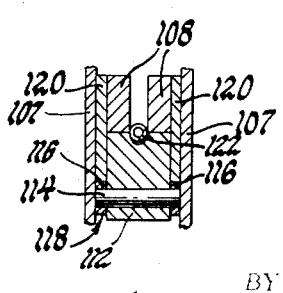

FIG. 11 is a section view taken along the line 11—11 of FIG. 8 and looking in the direction of the arrows.

Figure 1:
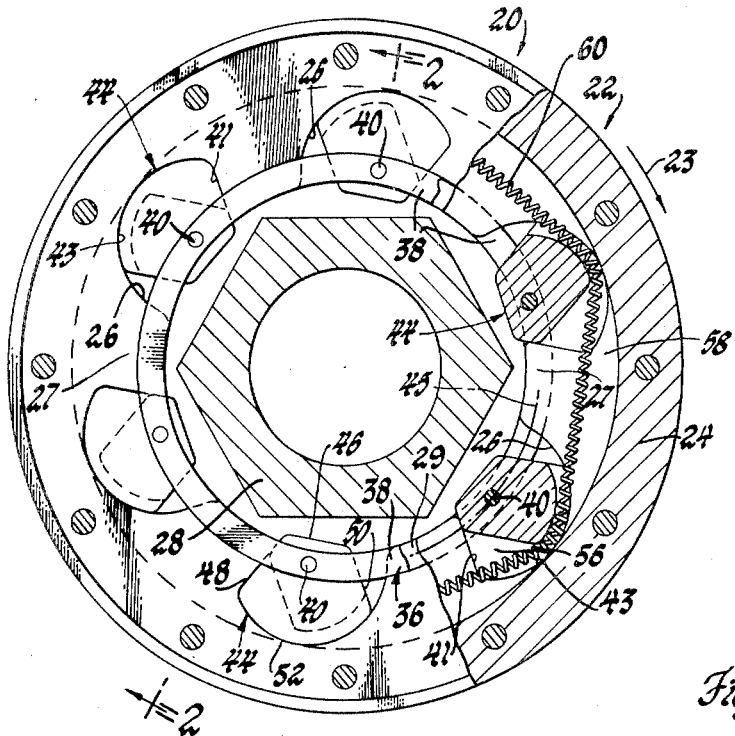
FIG. 1 is a frontal view partially in section showing an overrunning clutch in accordance with a first embodiment of my invention.

Referring first to FIG. 1, the overrunning clutch 20 is shown in its overrunning condition where the outer driving member indicated generally at 22 is rotating clockwise with respect to a hexagonal shaft 28 as indicated by the arrow 23. The driving member 22 includes a contour ring 24 provided with a plurality of circumferential recesses 26 which open toward the driven member or shaft 28 and which are separated by portions 27. The faces of the portions 27 have grooves 29 at their inner margins. A cage 36 comprising end rings 38 and pivot pins 40 is journaled on the contour ring 24 with the end rings 38 straddling the portions 27 and disposed in the grooves 29 with the cage 36 being rotatable with respect to the contour ring 24 to a limited extent.

Levers 44 generally in the shape of isosceles trapezoids are journaled on the pivot pins 40 and disposed in the recesses 26. Each of the recesses has a generally radial wall 41 which is rotated back from a radius through the center of the clutch in the overrun direction and thus forms an obtuse angle with the opening of the recess. Each recess continues with an arcuate wall 43 having a substantially constant radius of curvature connected to the radial wall 41 by a corner radius. The center for the arcuate wall is located in an imaginary circle 45 connecting the centers of the pivot pins 40 at the point which a pivot pin occupies when the lever 44 for a particular recess 26 is in the position shown in FIG. 1.

Figure 3:
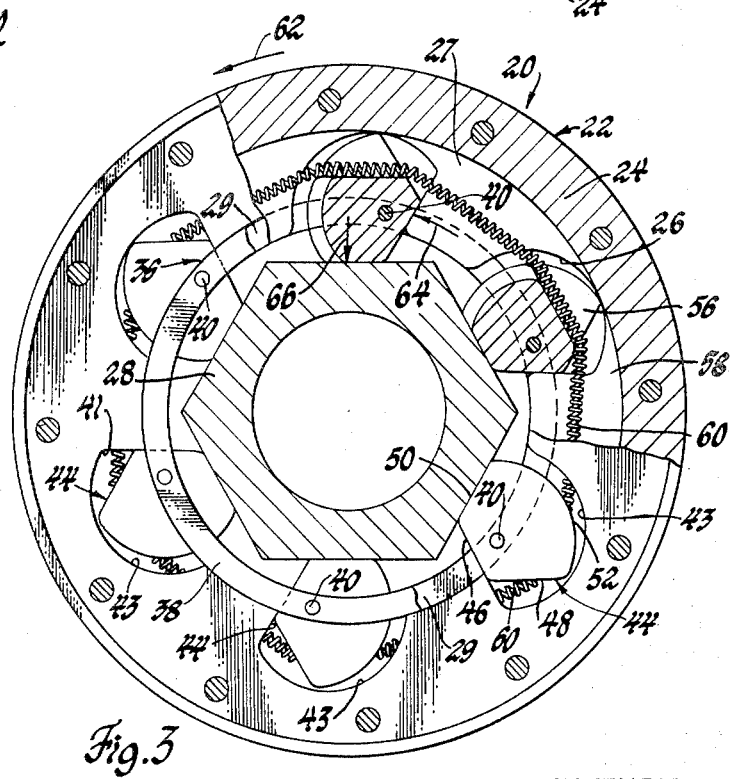
FIG. 3 is a view similar to FIG. 1 showing the clutch parts positioned for transmitting torque from the outer member to the inner shaft.
Figure 4:
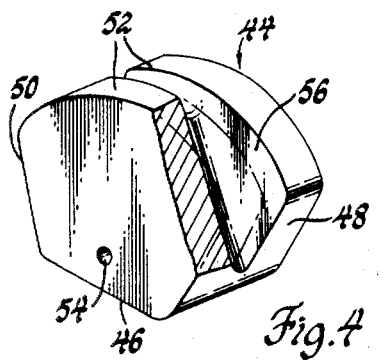
FIG. 4 is a perspective view of a typical lever shown in FIGS. 1, 2, and 3.

A typical lever 44 is shown in perspective in FIG. 4. It is generally in the shape of an isosceles trapezoid with a minor wall 46, angled side walls 48 and 50 and an arcuate major wall 52. The journal hole 54 which receives the pivot pin 40 is located midway between the angled side walls 48 and 50 and closer to the minor wall 46 than to either of the angled side walls 48 or 50. The arcuate major wall 52 is centered from the center of the pivot pin hole 40 and has a radius of curvature substantially equal to that of the arcuate walls 43 in the recesses 26 so that the levers 44 are rotatable from the freewheeling position shown in FIG. 1 to the engaged position shown in FIG. 3. In FIG. 1, the cage 36 is in its extreme position in the counterclockwise direction of its relative movement with respect to the contour ring 24 by reason of the mating arcuate surfaces of the levers and the recesses. In FIG. 3, the cage 36 is in its extreme position in the clockwise direction of its relative movement with respect to the contour ring 24.

Figure 2:
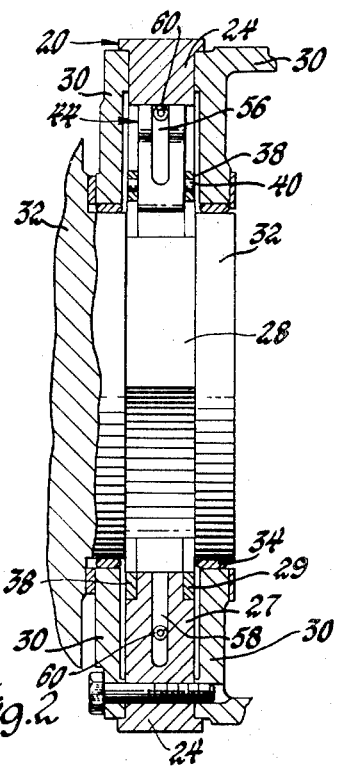
FIG. 2 is a section taken along the line 2—2 of FIG. 1 and looking in the direction of the arrows.

A groove 56 in the arcuate wall of the lever 44 diverges from the midpoint of the lever toward the angled side 48 adjacent the radial wall 41 of the recess. Radial grooves 58 in the portions 27 of the contour ring 24 are axially aligned with the grooves 56 of the levers and receive a garter spring 60. As can be seen in FIG. 2, side plates 30 are secured to the contour ring 24 by bolts extending through aligned holes in one of the side plates and the contour ring and threadably received in aligned threaded holes in the other side plate. The side plates 30 are journaled on supporting structure 32 with plain bearings 34 between the side plates and the supporting structure. The supporting structure 32 and shaft 28 can be an integral structure by machining a regular polygon shape in a cylindrical support.

The operation of the clutch 20 is as follows. In the freewheel condition shown in FIG. 1, the relative rotation of the outer driving member 22 in the clockwise direction indicated by arrow 23 produces a centrifugal force throwing the levers 44 radially outwardly against the force of the garter spring 60 and out of engagement with the hexagonal shaft 28. The centrifugal force is preferably sufficient to maintain the angled walls 48 of the levers in abutment with the radial walls 41 of the recesses since in such position, the minor walls 46 are spaced at their maximum from the hexagonal inner shaft 28. It is also to be noted that the groove in each lever distributes the weight of the lever such that the centrifugal force produces a clockwise moment on the lever and produces a minimal spring force acting against the levers in the counterclockwise direction. Both of these factors aid in maintaining the levers 44 in abutment with the radial walls 41 of the recesses 26.

As the relative speed of the outer member 22 in the clockwise direction decreases, the decreasing centrifugal force is overcome by the spring force of the garter spring 60 and the levers 44 rotate counterclockwise on their pivot pins 40. Since the minor walls 46 of the levers are closer to the pivot pin than the angled walls 48 which abut the radial walls 41 of the recesses 26, the cage shifts clockwise relative to the driving member. As the levers 44 rotate counterclockwise, the moment produced by the spring force increases. The levers 44 continue to rotate counterclockwise to the position shown in FIG. 3 where their minor walls 46 abut the radial walls 41 of the recesses and their angled walls 50 each abut a face on the hexagonal inner member 28. In this condition, there is a relatively strong spring force maintaining the levers 44 against the shaft 28. When the outer member 22 is subsequently driven counterclockwise indicated by the arrow 62 in FIG. 3, torque is transmitted from the radial walls 41 of the recesses to the minor walls 46 of the levers 44 as indicated by the arrow 64. This force acts radially outwardly of the pivot point of the levers producing a counterclockwise moment on the levers which in turn produces a normal force indicated at 66 at the engagement surface of the angled walls 50 of the levers with the faces of the hexagonal inner shaft 28. The normal force 66 is offset from the axis of the inner shaft thereby producing a counterclockwise couple on the inner shaft transferring the torque to it and the inner shaft 28 is rotated in the counterclockwise direction.

While the particular clutch which is disclosed shows six equally circumferentially spaced levers in conjunction with a hexagonal shaft, it will be obvious to a mechanic skilled in the art that a lesser number of levers may be used so long as they engage the shaft so as to produce a couple in the lock-up direction. Equally obvious is the fact that the shaft need not be hexagonal but that any shaft of regular polygonal shape can be used.

Figure 5:
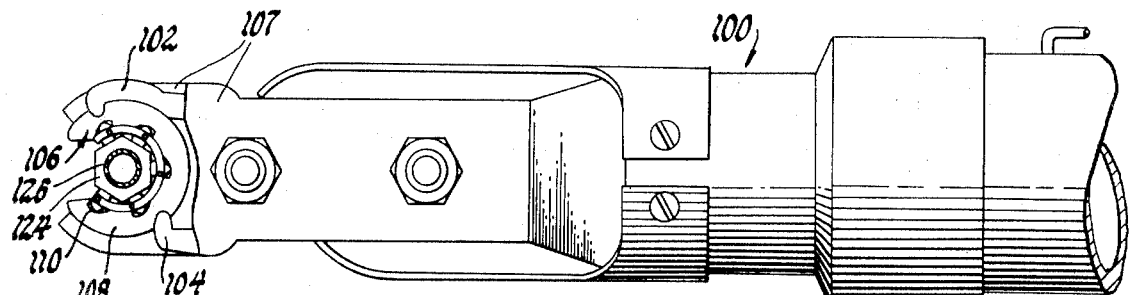
FIG. 5 is the plan view of a power wrench having a wrench head in accordance with a second embodiment of my invention.

Referring now to FIG. 5, I have illustrated a second embodiment of my invention wherein the use of trapezoidal levers pivotally mounted on a cage rotatable within limits with respect to the contour ring has been applied to a one-way ratchet wrench for selectively tightening or loosening a hexagonal nut or bolt without removing the wrench from the bolt. The wrench indicated generally at 100 is power driven by a reciprocating drive mechanism which oscillates the head of the wrench. The details of the power drive are not critical to the present invention but since this embodiment of my invention is capable of being power driven, the U.S. patent to Bloom 3,386,319 assigned to the assignee of this invention is incorporated herein by reference to a detailed description of a suitable power driving mechanism. The rods 102 and 104 which reciprocate 180° out of phase with each other are pertinent insofar as they provide a limited oscillatory back and forth motion to the wrench head indicated generally at 106. With the cover plate 107 broken away, the wrench head 106 is seen to include a contour ring 108 which as before has a plurality of circumferentially spaced recesses 110. Levers 112 generally in the shape of an isoceles trapezoid are pivotally mounted on pivot pins 114 which together with the end rings 116 form a cage 118 which, in this instance, is journaled on the side plates 120 (FIG. 11) for limited movement with respect to the contour ring 108. Also in this embodiment, the garter spring has been replaced by individual coil springs 122 with their hooked ends engaging pins 123 secured in aligned bores in the contour ring 108 and side plates 120. These springs are preferably stronger than the garter spring when the wrench is power driven at high speed to insure proper reorientation of the levers 112 to a lock-up position shown in FIG. 6. The wrench head 106, contour ring 108, and cage 118 are shown open to accommodate a condition where a nut 124 is threaded onto a tube 126 such as is shown in the aforementioned patent. However, it is to be understood that the wrench head and other associated parts could be closed or opened further for that matter to accommodate not only the tube 126 but also the nut 124.

The relationships between the shapes of the recesses 110 and the levers 112 and the position of the pivot pins 114 remain the same as that disclosed in conjunction with the overrunning clutch 20.

It will be appreciated that the operation is a little different, however, in that centrifugal force has no appreciable effect and that whereas the levers 44 were designed to be spaced out of contact with the hexagonal shaft 28 in the freewheel direction, in this instance, the levers 112 ratchet over the corners of the hexagonal nut 124.

In FIG. 6, the power wrench is at the position where torque has just been applied to the hexagonal nut 124 in the counterclockwise direction indicated by the arrow 128 and the wrench head is about to begin ratcheting over the nut corners. The upper arm 102 is extended to its extreme left-hand position as shown in FIG. 6 and the trapezoidal levers have their minor sides abutting the radial walls of the recesses in the contour ring 108 and their angled walls engaging a face on the hexagonal nut 124.

Figure 7:
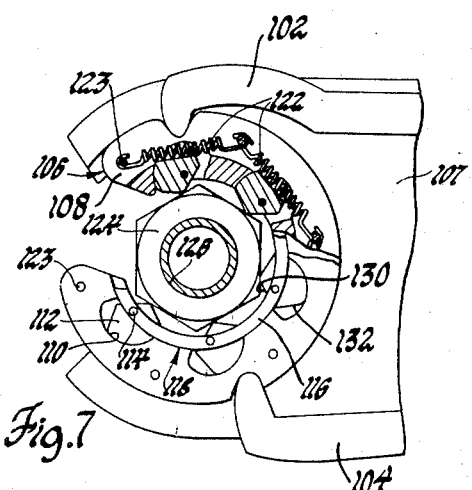

As the upper arm 102 moves to the right rotating the contour ring clockwise slightly to the position shown in FIG. 7, the cage 118 upon which the levers 112 are pivoted moves counterclockwise with respect to the contour ring 108 until the arcuate surface of the levers engage the mating arcuate surface in the recesses which act as a bearing surface to rotate the levers about their pivot pins 114.

Figure 9:
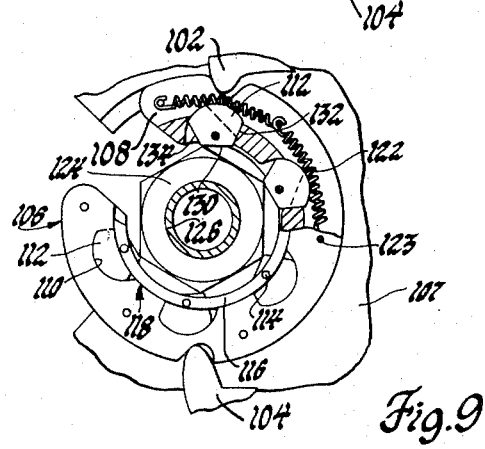
Figure 10:
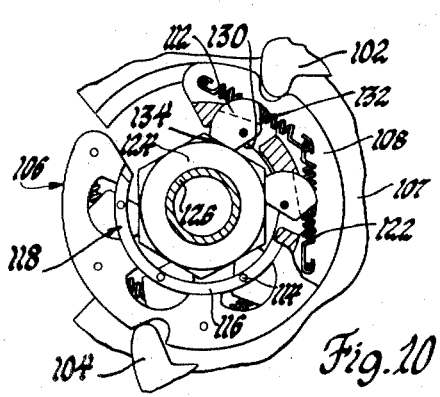

In FIG. 8, the levers 112 are further rotated in the recesses against the action of the springs 122 and the minor walls 130 on the levers engage the corners of the hexagonal nut until the edges of the minor walls 130 engage the corners of the nut at which time the angled walls 132 abut the radial walls of the recess and terminate rotation of the levers 112 as shown in FIG. 9. As the edges of the minor walls 130 pass the corners of the nut, the springs 122 start rotating the levers 112 counterclockwise and reorient them to the position shown in FIG. 10. The levers 112 now have their other angled walls 134 engaging the faces on the hexagonal nut and the upper rod 102 has reached its maximum position toward the right as viewed in FIG. 10. The minor walls 130 of the levers, however, are spaced from the radial walls of the recesses. The rods 102 and 104 are ready to reverse their linear direction. Before the reversal occurs, the inertia of the caged levers carries the cage 118 further counterclockwise relative to the contour ring 108 until the minor walls 130 engage the radial walls of the recesses whereupon torque is applied in the clockwise direction to the nut moving the rods 102 and 104 and the contour ring 108 to the position shown in FIG. 6 where the cycle is then repeated.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:

1. In a device for transmitting torque in a single direction to a member having a force-receiving surface in the shape of a regular polygon, comprising
   a rotatable member having an axis and a plurality of circumferentially spaced recesses open in a radial direction with respect to said axis, each of said recesses having a force-transmitting wall disposed at an obtuse angle with respect to its opening,
   a cage coaxial with and journaled on said rotatable member,
   a plurality of levers having generally the shape of an isosceles trapezoid with their angled sides disposed at substantially said obtuse angle wtih respect to their minor sides, said cage having pins pivotally mounting said levers on said cage midway between their angled sides and closer to their minor side than to either of the angled sides, each of said levers being disposed in one of said recesses and pivotable therein, said pins being so located with respect to said recesses such that one of said angled sides protrudes from said recess when said minor sides of said levers engage said force-transmitting surfaces on said rotatable member, said levers being circumferentially located such that their said one angled sides lie on an imaginary surface having the shape of a regular polygon with its center located at the axis of said member when said minor sides of said levers engage said force-transmitting surface of said recesses, and
   spring means operatively connected to said levers urging them toward a position where said one angled sides lie on said imaginary surface.

2. A device as defined in claim 1 further including a support for journaling said rotatable member and means mounted on said support structure operatively connected to said rotatable member to oscillate said rotatable member and wherein said levers have their minor sides spaced sufficiently close to said pivots to pass over the corners of said imaginary surface.

3. A device as defined in claim 2 wherein said support, said rotatable member, and cage have openings which are substantially aligned when said levers are in said position.

4. An overrunning clutch comprising in combination,
   a driven member having a force-receiving face in the shape of a regular polygon,
   a driving member coaxial with and radially spaced from said driven member, said driving member having a plurality of circumferentially spaced recesses opening toward said driven member, each of said recesses having a force-transmitting wall disposed at an obtuse angle with respect to its opening,
   a cage coaxial with and journaled on said driving member,
   a plurality of levers having generally the shape of an isosceles trapezoid with their angled sides disposed at substantially said obtuse angle with respect to their minor sides, said cage having pins pivotally mounting said levers on said cage midway between their angled sides and closer to their minor side than to their angled sides, each of said levers being disposed in one of said recesses with said pin radially between said force-transmitting surfaces and said driven member, said levers being pivotable in said recesses between a first and a second position, said minor side and one of said angled sides of said levers respectively engaging said force-transmitting walls on said driving member and said force-receiving face on said driven member in said first position of said levers to transmit torque from said driving member to said driven member in a first direction, said minor side and the other of said angled sides being respectively spaced from said driven member and engaging said force-transmitting walls in a second position of said levers whereby said driven member freewheels in the opposite direction, and
   spring means operatively connected to said levers to urge them toward said first position.

5. The overrunning clutch as defined in claim 4 wherein the driving member is radially outward of said driven member and wherein said spring means is a garter spring engaging said levers on a side remote from said minor side.

6. The overrunning clutch as defined in claim 5 wherein said remote sides have grooves which diverge from the midpoint of said levers toward said one angled sides and wherein said garter spring is disposed in said grooves.

7. An overrunning clutch comprising in combination,
   a driven member having a force-receiving face in the shape of a regular polygon,
   an annular driving member coaxially surrounding said driven member with its inner circumferential surface spaced from said driven member,
   a cage journaled on said driving member adjacent its inner circumferential surface and spaced from said driven member, said cage having a plurality of pivot pins located in an imaginary circle coaxial with said driven member,
   a plurality of recesses in said inner circumferential surface, each of said recesses having an outwardly diverging wall extending radially outwardly from said imaginary circle,
   a plurality of levers journaled on said pivots and extending into said recesses, said levers having a substantially planar wall merging into equally diverging radial walls at its end, said planar walls being closer to said pivot than either of said diverging radial walls such that said cage shifts with respect to said driving member as said levers pivot between a first position where one of said diverging walls abuts said diverging wall on said recess and said planar wall is spaced from said member, and a second position where said planar wall abuts said diverging wall on said recess and the other of said diverging walls on said levers protrude further from said recesses and into engagement with said driven member, and
   spring means operatively connected to said levers to urge them toward said second position.

8. The overrunning clutch as defined in claim 7 wherein said recesses continue from said outwardly diverging walls with arcuate walls having a substantially constant radius of curvature centered from the centers of their respective pivot pins when said levers are in said second position, wherein said pivots are midway between said equally diverging walls of said levers and wherein said levers have arcuate walls remote from said planar walls having a radius of curvature substantially equal to said radius of said arcuate walls in said recesses.

9. The overruning clutch as defined in claim 8 wherein said remote arcuate walls on said levers have grooves, and wherein said spring means is a garter spring disposed in said grooves.

10. The overrunning clutch as defined in claim 9 wherein said grooves diverge from a point midway of said levers toward said one diverging wall.

References Cited
UNITED STATES PATENTS

| | | | |
|---|---|---|---|
| 2,602,362 | 7/1952 | Johns | 192—46 XR |
| 2,700,315 | 1/1955 | Hermanson. | |

MARK M. NEWMAN, Primary Examiner

A. D. HERRMANN, Assistant Examiner

U. S. Cl. X.R.

81—60, 91; 192—71, 103